(12) United States Patent
Dunne et al.

(10) Patent No.: US 11,520,846 B2
(45) Date of Patent: Dec. 6, 2022

(54) PETITION CREATION THROUGH SOCIAL ANALYTICS

(71) Applicant: INTERNATIONAL BUSINESS MACHINES CORPORATION, Armonk, NY (US)

(72) Inventors: Jonathan D. Dunne, Dungarvan (IE); Nadiya Kochura, Bolton, MA (US); Alex Xingqi Casella, Cambridge, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 16/704,055

(22) Filed: Dec. 5, 2019

(65) Prior Publication Data
US 2021/0173886 A1    Jun. 10, 2021

(51) Int. Cl.
*G06F 16/9536*    (2019.01)
*G06F 40/186*    (2020.01)
*G06F 40/174*    (2020.01)

(52) U.S. Cl.
CPC ........ *G06F 16/9536* (2019.01); *G06F 40/174* (2020.01); *G06F 40/186* (2020.01)

(58) Field of Classification Search
CPC ... G06F 16/9536; G06F 40/186; G06F 40/174
See application file for complete search history.

(56) References Cited

U.S. PATENT DOCUMENTS

| | | | |
|---|---|---|---|
| 7,970,643 B2 | 6/2011 | Jeffrey | |
| 2012/0042072 A1 | 2/2012 | Glanton | |
| 2013/0085828 A1* | 4/2013 | Schuster | G06Q 50/01 705/14.25 |
| 2014/0324442 A1 | 10/2014 | Barnes, III | |
| 2015/0212997 A1 | 7/2015 | Kassim | |
| 2016/0034757 A1* | 2/2016 | Chhichhia | G06K 9/6219 382/206 |
| 2018/0285730 A1* | 10/2018 | Zhao | G06N 5/022 |
| 2019/0188250 A1* | 6/2019 | Zawierka | G06F 40/166 |
| 2020/0027171 A1* | 1/2020 | Oren | G06Q 50/01 |

OTHER PUBLICATIONS

Anonymous, "Method for Analytics and Contextual Aggregation for Sign Campaign", An IP.com Prior Art Database Technical Disclosure, IP.com No. IPCOM000239957D, IP.com Electronic Publication Date: Dec. 17, 2014, 4 pages.
change.org, "Privacy Policy", Privacy—Change.org, Last updated May 24, 2018, https://www.change.org/policies/privacy, 10 pages.
Jalali et al., "Information Diffusion Through Social Networks: The Case of an Online Petition", Expert Systems with Applications vol. 44, 2016, p. 187-197.

* cited by examiner

*Primary Examiner* — Kyle R Stork
(74) *Attorney, Agent, or Firm* — Lily Neff (57) ABSTRACT

A method, computer system, and computer program product for petition creation through social analytics are provided. The embodiment may include generating a repository of user social data. The embodiment may also include extracting one or more social topics that are related to the user social data. The embodiment may further include generating a social supplication model using the repository and the extracted social topic. The embodiment may also include determining discussion issues within the social topic and a topic discussion distance between each user based on the generated social supplication model. The embodiment may further include generating a petition based on a determined discussion issue.

20 Claims, 7 Drawing Sheets

PETITION CREATION THROUGH SOCIAL ANALYTICS

BACKGROUND

The present invention relates, generally, to the field of computing, and more particularly to creating a petition utilizing social analytics.

Social analytics relate to monitoring, analyzing, and interpreting digital interactions and relationships of users, topics, ideas, and content. Social analytics may include sentiment analysis, natural-language processing, and social networking analysis. Social analytics may utilize various techniques such as text analysis, predictive modeling and recommendations, and automated identification and classification of subject, topic, users, or content. An example of social analytics is social media analytics which is the process of gathering and analyzing data from social media sites to extract valuable hidden insights from vast amounts of unstructured social media data to enable informed and insightful decision making. Typically, there are three main steps in analyzing social media: data identification, data analysis, and information interpretation.

SUMMARY

According to one embodiment, a method, computer system, and computer program product for petition creation through social analytics are provided. The embodiment may include generating a repository of user social data. The embodiment may also include extracting one or more social topics that are related to the user social data. The embodiment may further include generating a social supplication model using the repository and the extracted social topic. The embodiment may also include determining discussion issues within the social topic and a topic discussion distance between each user based on the generated social supplication model. The embodiment may further include generating a petition based on a determined discussion issue.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to petition creation using social analytics. The following described exemplary embodiments provide a system, method, and program product to perform analyses of prior social data using topic analysis and relationship analysis to derive a social supplication model and to determine relevant users to engage for a petition based on the generated social supplication model. Therefore, the present embodiment has the capacity to improve the technical field of digital petition creation systems by grouping particular social topics and individuals via topical analysis and relationship analysis and determining relevant users to engage for a petition associated with a particular social topic.

As previously described, social analytics relate to monitoring, analyzing, and interpreting digital interactions and relationships of users, topics, ideas, and content. Social analytics may include sentiment analysis, natural-language processing, and social networking analysis. Social analytics may utilize various techniques such as text analysis, predictive modeling and recommendations, and automated identification and classification of subject, topic, users, or content. An example of social analytics is social media analytics which is the process of gathering and analyzing data from social media sites to extract valuable hidden insights from vast amounts of unstructured social media data to enable informed and insightful decision making. Typically, there are three main steps in analyzing social media: data identification, data analysis, and information interpretation.

There are different social or political issues that are discussed through a different medium. Individuals may want to make an impact to change things for good. There are multiple web sites that can help individuals launch a petition campaign. However, there are still needs for certain measures to ensure each petition is effective. Certain petitions may not be so effective due to the fact that there is a disconnection between right individuals to commission a petition or some statements stated on petition sites are incorrectly aligned with an appropriate cause or an issue. As such, it may be advantageous to, among other things, implement a system capable of identifying right users to disseminate a petition with a greater outreach based on a topical and relationship model using social analytics.

According to one embodiment, the present invention may analyze events that may cause a negative impact in the society and identify appropriate individuals to be automatically contacted for creating a petition in order to prevent harmful results to the society. In at least one other embodiment, the present invention may automatically create a petition and then reach out to relevant users to sign the petition based on the analyzed profile data, travel patterns, and other relevant data. According to one other embodiment, the present invention may further apply the same data to further enhance the petition's statements with supporting arguments.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for automatically generating a petition that can reach out to more numbers of relevant users based on a social supplication model.

Figure 1:
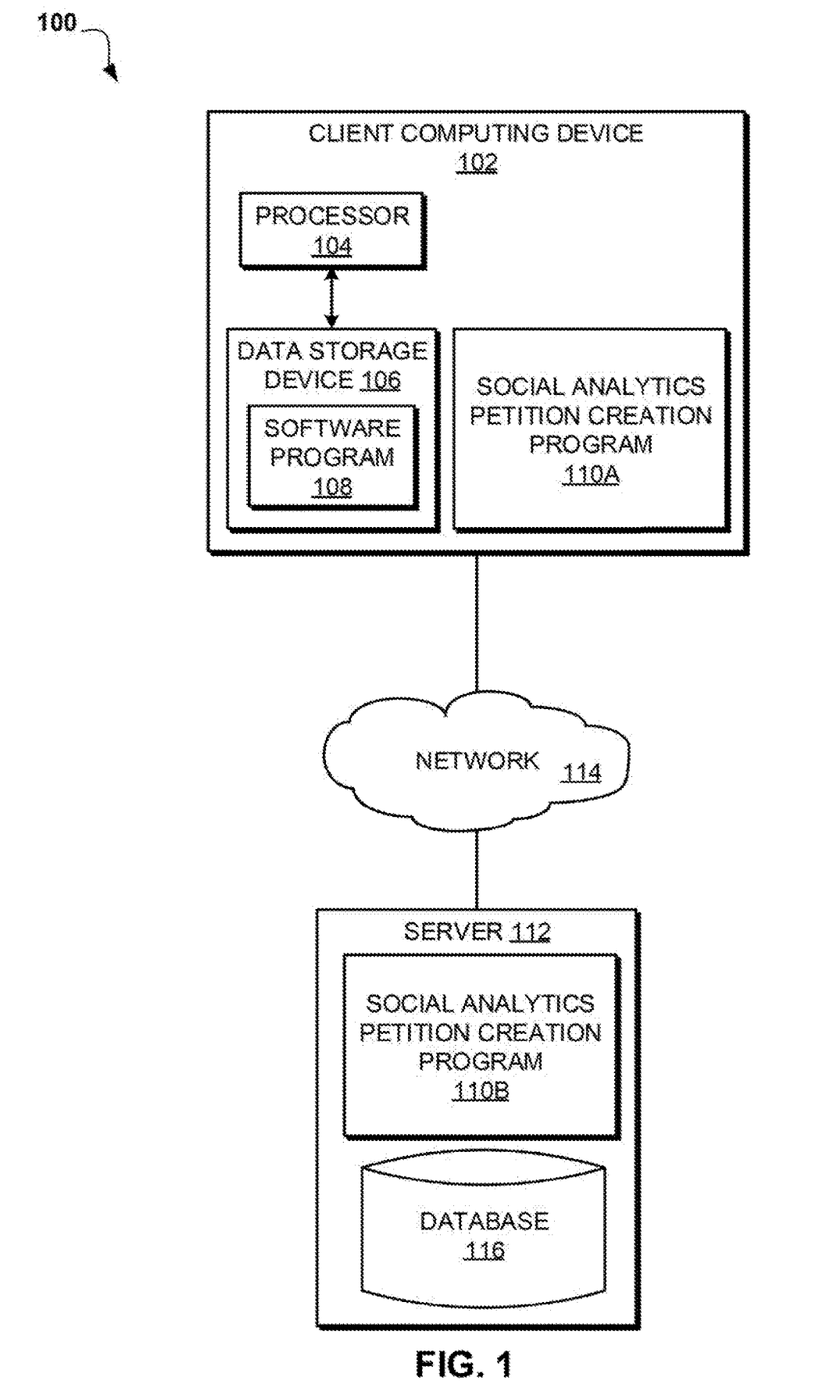
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a social analytics petition creation program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a social analytics petition creation program 110B and a database 116 and communicating with the client computing device 102 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the social analytics petition creation program 110A, 110B may be a program capable of analyzing prior social data to derive a social supplication model. The social analytics petition creation program 110A, 110B may also use the generated model to determine the types of issues users discuss and the distance between these people in terms of the topic discussion. The social analytics petition creation program 110A, 110B may further determine each user's social discourse footprint to transfer the user data across multiple petition domains. The social analytics petition creation process is explained in further detail below with respect to FIG. 2.

Figure 2:
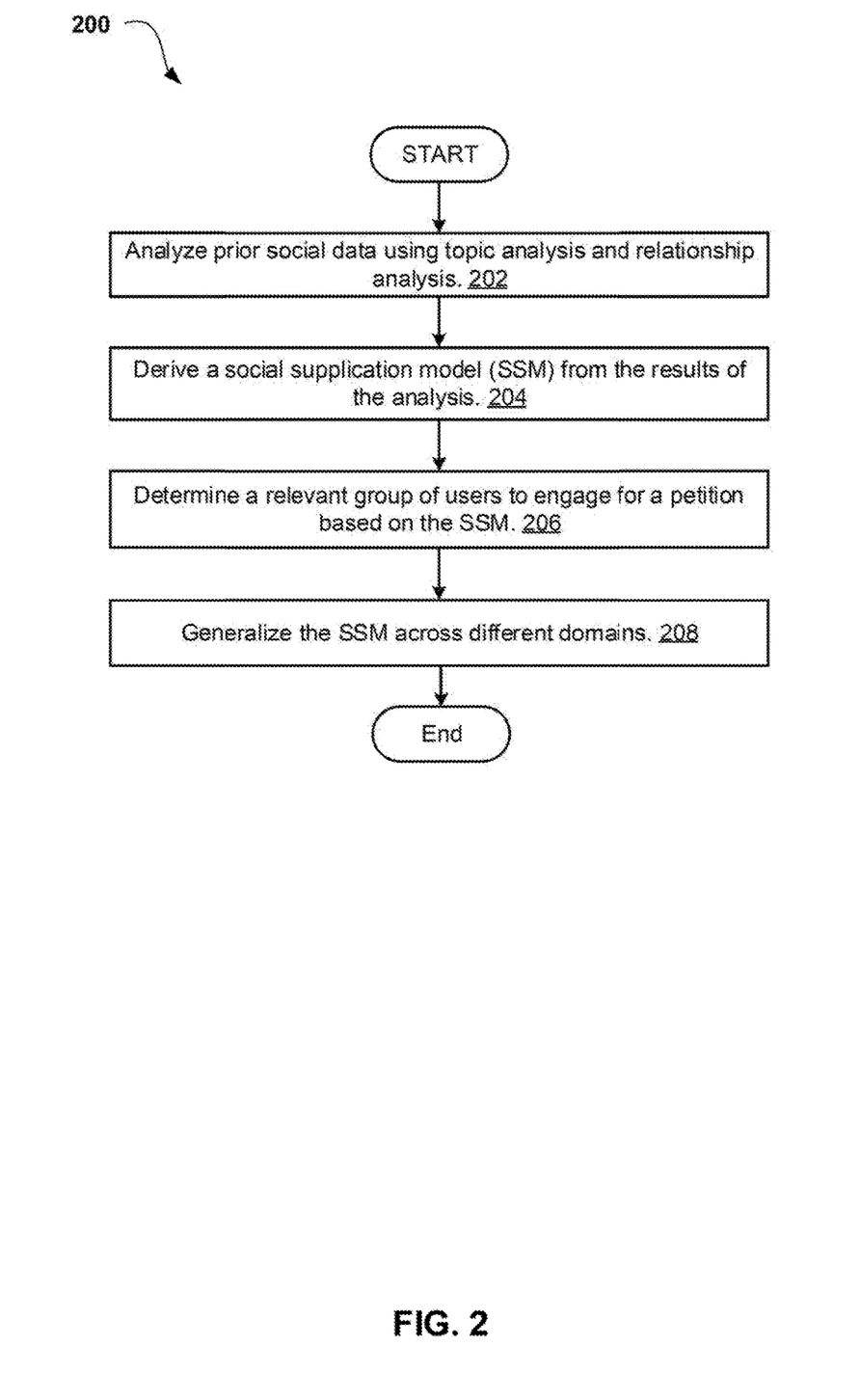
FIG. 2 is an operational flowchart illustrating a social analytics petition creation process according to at least one embodiment.

FIG. 2 is an operational flowchart illustrating a social analytics petition creation process 200 according to at least one embodiment. At 202, the social analytics petition creation program 110A, 110B analyzes prior social data using topic analysis and relationship analysis. According to one embodiment, the social analytics petition creation program 110A, 110B may search social media sites and news media sites for events that may cause negative impact in communities. The social analytics petition creation program 110A, 110B may also ingest GPS information to keep track of individuals who may have been involved in a particular area when the event with negative impact happened. In at least one other embodiment, the social analytics petition creation program 110A, 110B may analyze prior social data to determine relationships between users and social topics. In yet another embodiment, the social analytics petition creation program 110A, 110B may utilize existing techniques, such as LDA, Biterm for social topic disclosure analysis and GLoVE, word2vec to analyze content distance. The social analytics petition creation program 110A, 110B may also utilize a known distance analysis method, such as cosine distance or Jaccard similarity.

At 204, the social analytics petition creation program 110A, 110B derives a social supplication model (SSM) from the results of the analysis. According to one embodiment, the social analytics petition creation program 110A, 110B may combine the results of the analysis of the social topic disclosure and the content distance in the form of a matrix to provide a model that represents a relationship between a user and a particular social topic. For example, the social analytics petition creation program 110A, 110B may combine a matrix pertaining to topic modeling analysis and another matrix pertaining to relationship analysis to generate a social supplication model. The generated social supplication model may represent the types of issues various users discuss and the distance between these users in terms of their topic discussion.

At 206, the social analytics petition creation program 110A, 110B determines a relevant group of users to engage for a petition based on the SSM. According to one embodiment, the social analytics petition creation program 110A, 110B may utilize the generated social supplication model to determine the types of issues different users discuss and the distance between the users with respect to each social topic. The social analytics petition creation program 110A, 110B may determine that a particular user may be a mover closely related to a particular social topic and such a user may be more likely to engage in online petition creation and signing. The social analytics petition creation program 110A, 110B may distribute the petition to each user within a preconfigured topic discussion distance of the determined discussion issue associated with the petition. For example, the social analytics petition creation program 110A, 110B may determine the distance between other users and other social topics represented by a numeric score generated based on the social supplication model. For instance, if user A is closely related to a social topic involving environmental issues and user B is related to another environmental issue, the social analytics petition creation program 110A, 110B may assign a relatively high score to indicate that these two users may be more interested in engaging in online petition creation and signing together with respect to an environmental issues.

At 208, the social analytics petition creation program 110A, 110B generalizes the SSM across different domains. According to one embodiment, the social analytics petition creation program 110A, 110B may determine which users may be transferred across multiple petition domains based on their social discourse footprints. For example, if user A and user B may be interested in environmental issues and may be somewhat interested in social justice or political issues. In such a case, the social analytics petition creation program 110A, 110B may group user A and user B together and assign a different numeric score to social justice issues or political issues based on their social disclosure footprints on social media sites, such that the social analytics petition creation program 110A, 110B may recommend to user A and user B to create or join a new petition pertaining not only to environmental issues but also other social justice or political issues.

Figure 3:
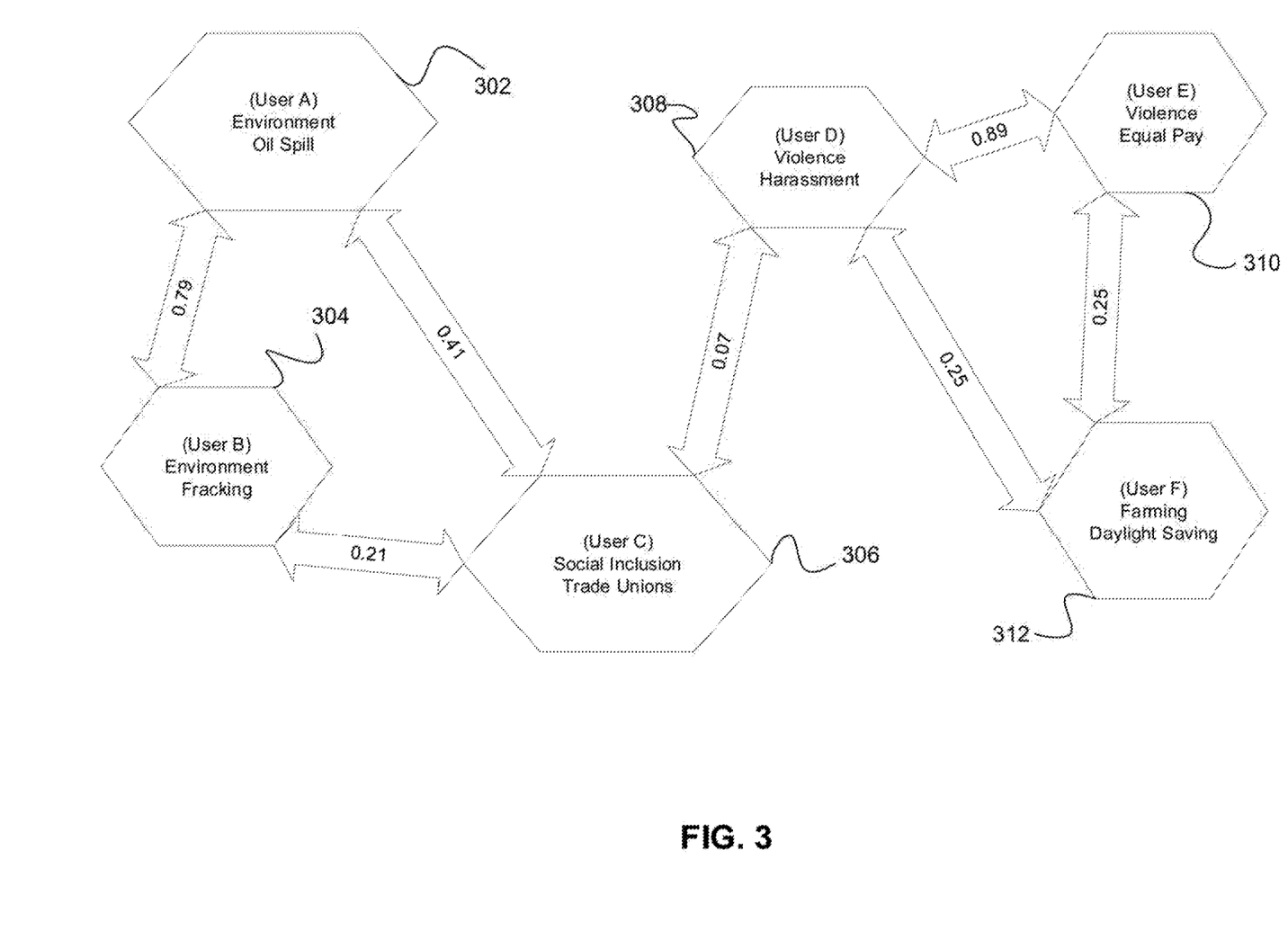
FIG. 3 is a block diagram showing an exemplary topic and distance analysis associated with a social supplication model according to at least one embodiment.

Referring now to FIG. 3, a block diagram showing an exemplary topic and distance analysis associated with a social supplication model is depicted according to at least one embodiment. According to one embodiment, the social analytics petition creation program 110A, 110B may analyze prior social data involving multiple users and extract social topic data associated with each user. The social analytics petition creation program 110A, 110B may then group a particular user and a social topic together to analyze distance between other users and other topics by assigning a distance score. For instance, a group "User A—Environment/Oil spill" 302 may have a strong affinity with a group "User B—Environment/Fracking" 304 by representing their relationships with a relatively high score of 0.79. A group "User C—Social inclusion/Trade unions" 306 may be less related to a group "User D—Violence/Harassment" 308 with a score of only 0.07. However, the group "User D—Violence/Harassment" 308 may be strongly related to the group "User E—Violence/Equal Pay" 310 with a score of 0.89 as both User D and User E share a common interest in violence issues. A group "User F— Farming/Daylight saving" 312 may be a little bit related to both the group "User D—Violence/Harassment" 308 and the group "User E—Violence/Equal Pay" 310 based on User E and User D's other social disclosure footprints on social media sites although violence issues and farming issues are not so related.

Figure 4:
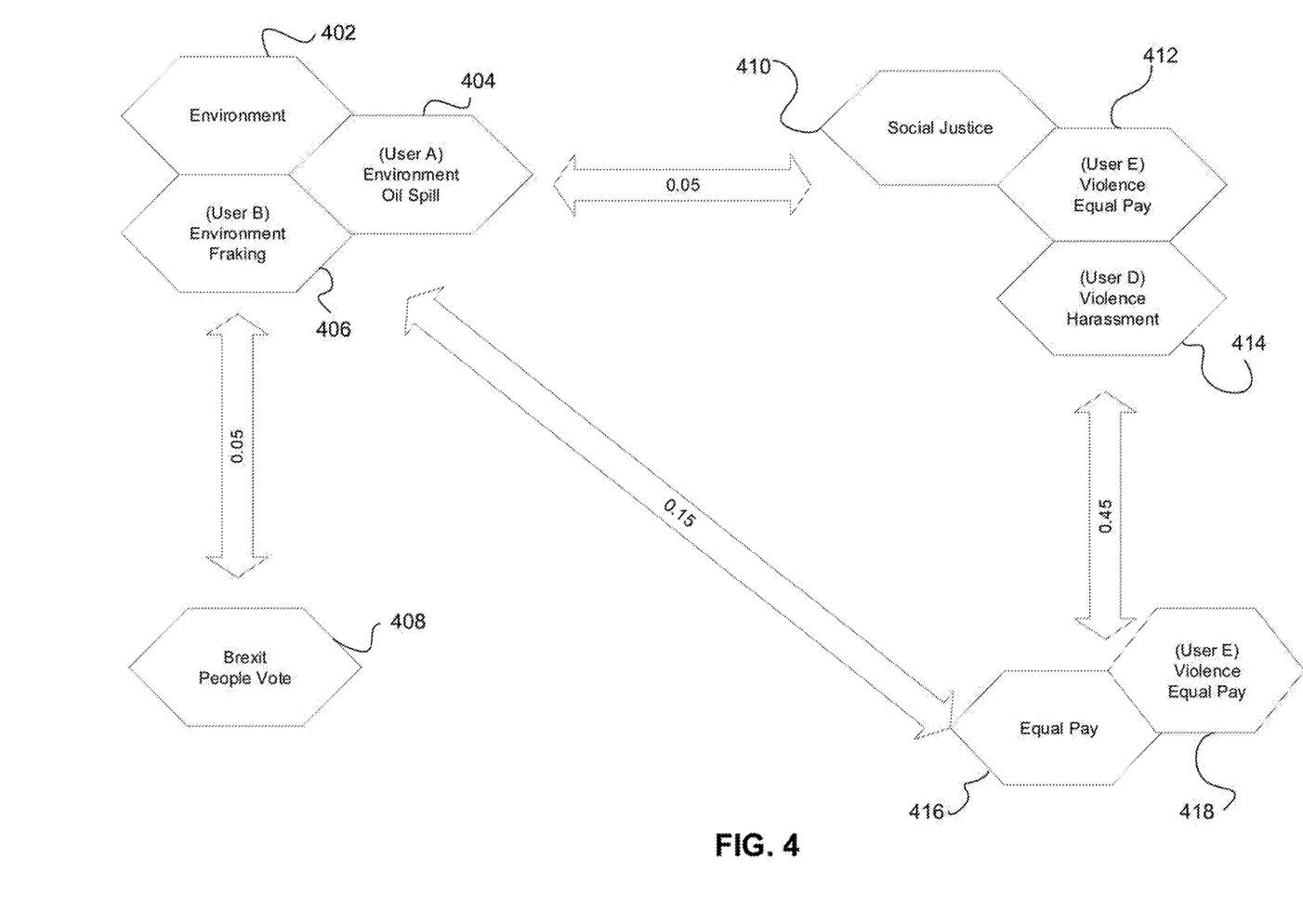
FIG. 4 is a block diagram showing an exemplary domain transference based on a social supplication model according to at least one embodiment.

Referring now to FIG. 4, a block diagram showing an exemplary domain transference based on a social supplication model is depicted according to at least one embodiment. The social analytics petition creation program 110A, 110B may utilize the results of the topic modeling analysis and distance analysis to group certain topics and users together as described in relation to FIG. 3 above. In at least one other embodiment, the social analytics petition creation program 110A, 110B may further group one or more users-social topic groups together to analyze a relationship distance between different domains. For example, a group "Environment" 402 may be now grouped together with a group "User A—Environment/Oil Spill" 404 and a group "User B—Environment/Fracking" 406 to determine a relationship with a different domain such as a group "Brexit/People Vote" 408, a group "Equal Pay" 416 or a group "Social Justice" 410. The group "Social Justice" 410 may be grouped together with a group "User E—Violence/Equal Pay" 412 and a group "User D—Violence/Harassment" 414. The group "Equal Pay" 416 may be grouped together with a group "User E—Violence/Equal Pay" 418. In at least one other embodiment, the social analytics petition creation program 110A, 110B may assign relationship values to each relationship of the above anchor topics. For example, the social analytics petition creation program 110A, 110B may assign 0.05 to the relationship between "Environment" 402, "User B—Environment/Fracking" 406 and "User A—Environment/Oil Spill" 404 and "Brexit/People Vote" 408 and 0.15 to the relationship between "Equal Pay" 416 and "Environment" 402, "User B—Environment/Fracking" 406 and "User A—Environment/Oil Spill" 404. According to one other embodiment, the social analytics petition creation program 110A, 110B may display relationship values in different colors in accordance with the pre-configured value ranges. For example, the social analytics petition creation program 110A, 110B may display relationship values between 0.01 and 0.25 in red, 0.26 and 0.5 in yellow and any values over 0.5 in green so that a user may recognize the strength of relationship between two particular groups of topics.

It may be appreciated that FIGS. 2-4 provide only an illustration of one implementation and do not imply any limitations with regard to how different embodiments may be implemented. Many modifications to the depicted environments may be made based on design and implementation requirements. For example, in at least one embodiment, the social analytics petition creation program 110A, 110B may generate a relation model and relationship diagrams to users and recommend the users to create a new petition or join an already-existing petition related to the similar social topics.

Figure 5:
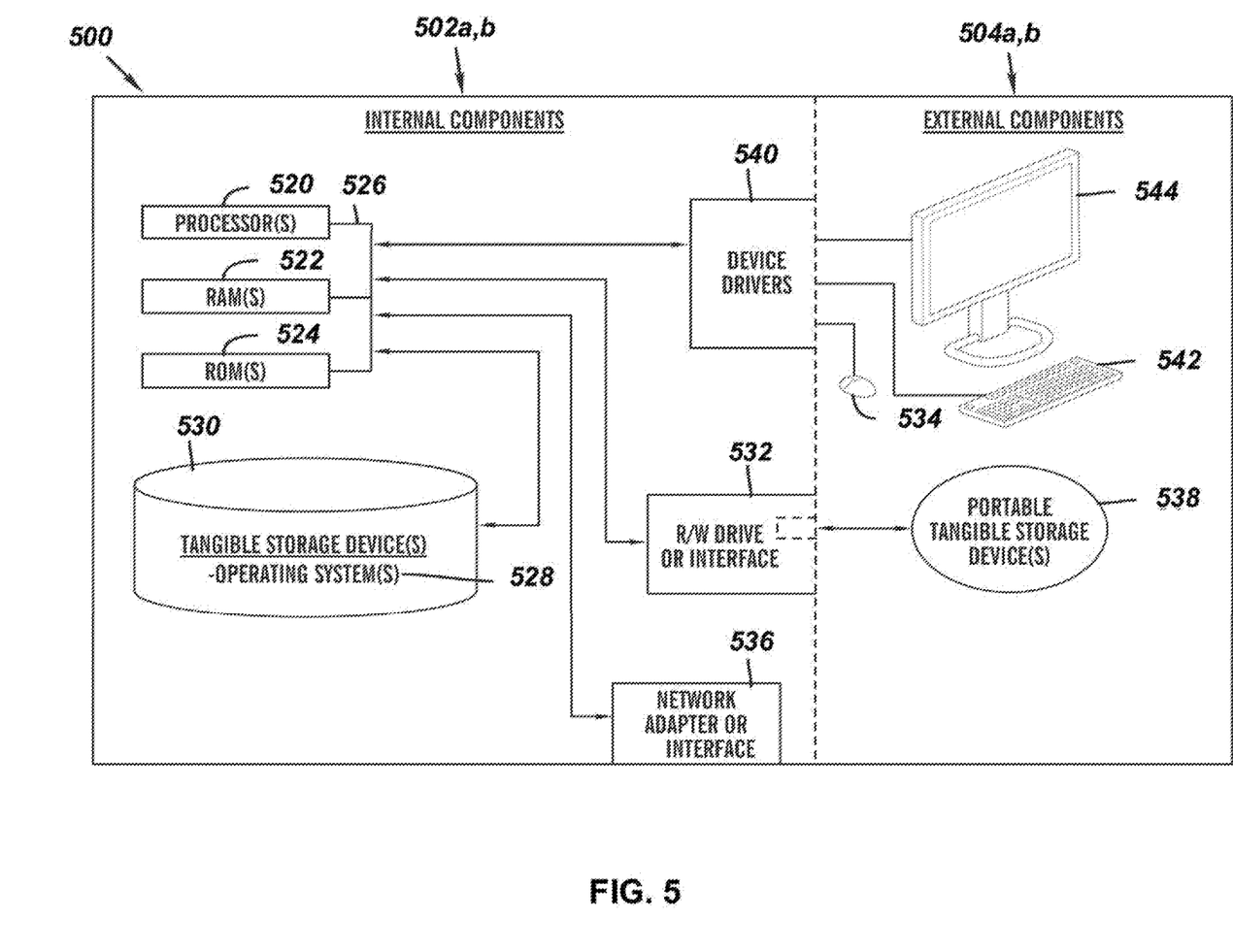
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smartphone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 508 and the social analytics petition creation program 110A in the client computing device 102 and the social analytics petition creation program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 *a,b* also includes an R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the social analytics petition creation program 110A, 110B can be stored on one or more of the respective portable computer-readable tangible storage devices 538, read via the respective R/W drive or interface 532 and loaded into the respective hard drive 530.

Each set of internal components 502 *a,b* also includes network adapters or interfaces 536 such as a TCP/IP adapter cards, wireless Wi-Fi interface cards, or 3G or 4G wireless interface cards or other wired or wireless communication links. The software program 108 and the social analytics petition creation program 110A in the client computing device 102 and the social analytics petition creation program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the social analytics petition creation program 110A in the client computing device 102 and the social analytics petition creation program 110B in the server 112 are loaded into the respective hard drive 530. The network may comprise copper wires, optical fibers, wireless transmission, routers, firewalls, switches, gateway computers and/or edge servers.

Each of the sets of external components 504 *a,b* can include a computer display monitor 544, a keyboard 542, and a computer mouse 534. External components 504 *a,b* can also include touch screens, virtual keyboards, touch pads, pointing devices, and other human interface devices. Each of the sets of internal components 502 *a,b* also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 6:
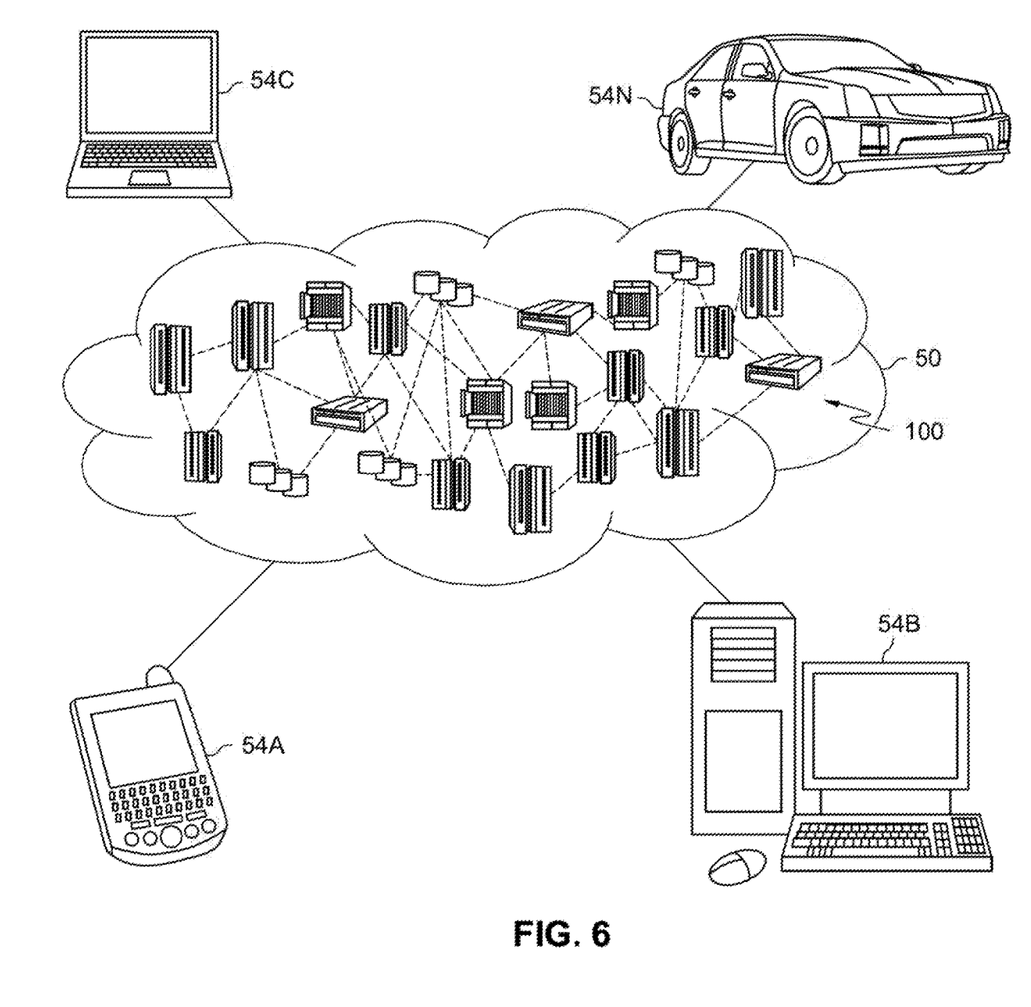
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
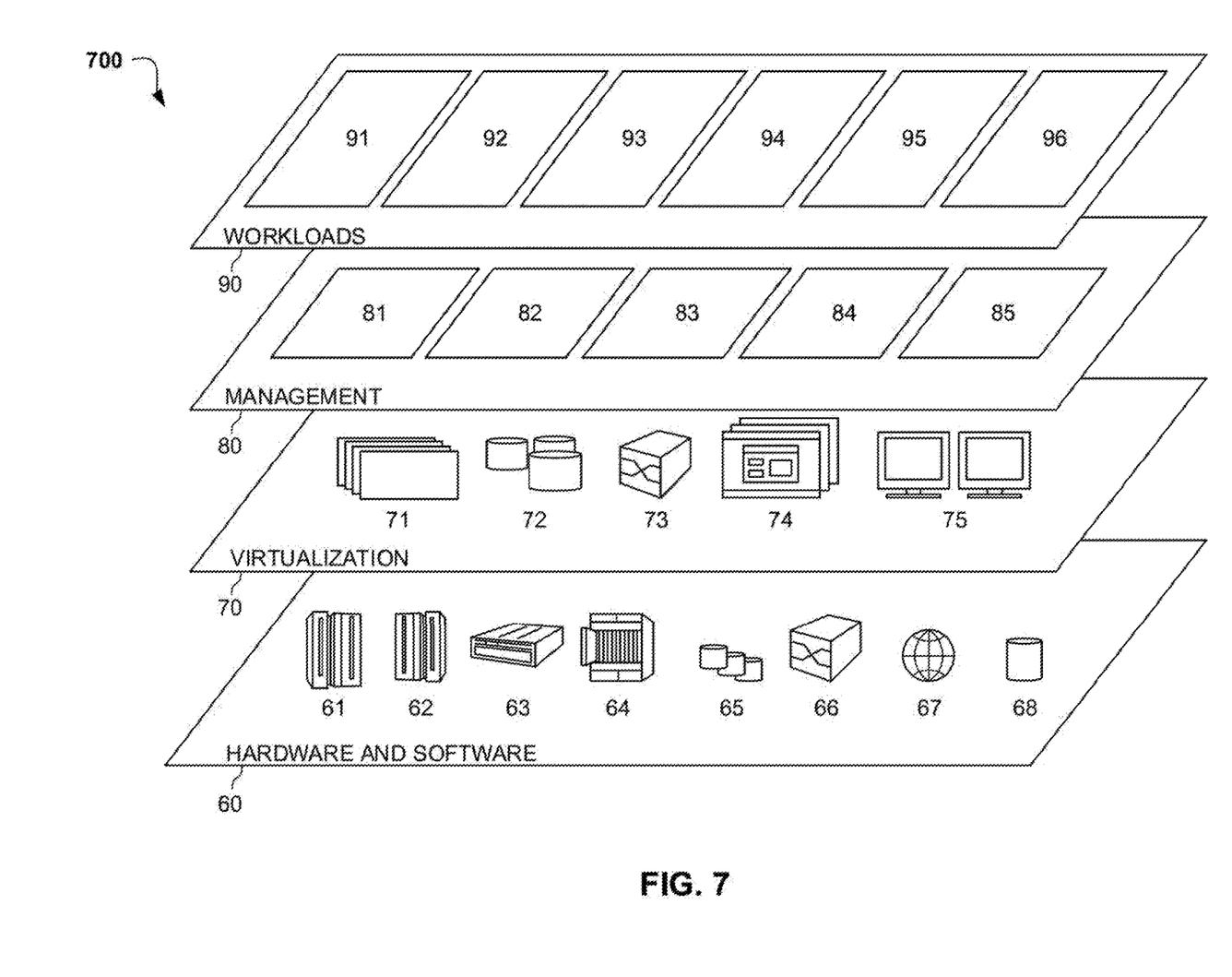
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social analytics petition creation 96. Social analytics petition creation 96 may relate to deriving a social supplication model using analyzed social topics and user's relationship distance based on social media sites.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for petition creation through social analytics, the method comprising:
   obtaining information about a particular event;
   extracting one or more social topics from a repository of one or more users' social data that are related to said particular event;
   generating a social supplication model by analyzing said social topics and relationship to said event and providing a score associated with each user based on said user's relationship with said topic and said event
   associating one or more users to each social topic based on said score;
   associating one or more users to one another when said one or more users are associated to a same social topic;
   notifying at least one of said users associated to said same social topic that a petition can be generated relating to said same social topic.

2. The method of claim 1, wherein the repository of user social data is generated based on social media sites.

3. The method of claim 1, further comprising:
   calculating cosine differences of the extracted social topics to determine relationships between the topics.

4. The method of claim 1, further comprising:
   utilizing topic modeling algorithms to extract one or more social topics from the generated repository.

5. The method of claim 1, further comprising:
   generating a petition on said determined discussion topic upon notification that at least one of said users is interested in a petition; and
   distributing the petition to each user within a preconfigured topic discussion distance of the determined discussion issue associated with the petition.

6. The method of claim 1, further comprising:
   displaying the topic discussion distance in different colors based on a preconfigured topic discussion distance and a preconfigured distance range.

7. The method of claim 1, further comprising:
   recommending a petition creation related to other social topics that is within a preconfigured topic discussion distance range to said associated users.

8. A computer system for petition creation through social analytics, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
obtaining information about a particular event;
extracting one or more social topics from a repository of one or more users' social data that are related to said particular event;
generating a social supplication model by analyzing said social topics and relationship to said event and providing a score associated with each user based on said user's relationship with said topic and said event;
associating one or more users to each social topic based on said score;
associating one or more users to one another when said one or more users are associated to a same social topic;
notifying at least one of said users associated to said same social topic that a petition can be generated relating to said same social topic.

9. The computer system of claim 8, wherein the repository of user social data is generated based on social media sites.

10. The computer system of claim 8, further comprising:
calculating cosine differences of the extracted social topics to determine relationships between the topics.

11. The computer system of claim 8, further comprising:
utilizing topic modeling algorithms to extract one or more social topics from the generated repository.

12. The computer system of claim 8, further comprising:
generating a petition on said determined discussion topic upon notification that at least one of said users is interested in a petition; and
distributing the petition to each user within a preconfigured topic discussion distance of the determined discussion issue associated with the petition.

13. The computer system of claim 8, further comprising:
displaying the topic discussion distance in different colors based on a preconfigured topic discussion distance and a preconfigured distance range.

14. The computer system of claim 8, further comprising:
recommending a petition creation related to other social topics that are within a preconfigured topic discussion distance range to each associated user.

15. A computer program product for petition creation through social analytics, the computer program product comprising:
one or more computer-readable tangible storage media and program instructions stored on at least one of the one or more tangible storage media, the program instructions executable by a processor of a computer to perform a method, the method comprising:
obtaining information about a particular event;
extracting one or more social topics from a repository of one or more users' social data that are related to said particular event;
generating a social supplication model by analyzing said social topics and relationship to said event and providing a score associated with each user based on said user's relationship with said topic and said event;
associating one or more users to each social topic based on said score;
associating one or more users to one another when said one or more users are associated to a same social topic;
notifying at least one of said users associated to said same social topic that a petition can be generated relating to said same social topic.

16. The computer program product of claim 15, wherein the repository of user social data is generated based on social media sites.

17. The computer program product of claim 15, further comprising:
calculating cosine differences of the extracted social topics to determine relationships between the topics.

18. The computer program product of claim 15, further comprising:
utilizing topic modeling algorithms to extract one or more social topics from the generated repository.

19. The computer program product of claim 15, further comprising:
generating a petition on said determined discussion topic upon notification that at least one of said users is interested in a petition; and
distributing the petition to each user within a preconfigured topic discussion distance of the determined discussion issue associated with the petition.

20. The computer program product of claim 15, further comprising:
displaying the topic discussion distance in different colors based on a preconfigured topic discussion distance and a preconfigured distance range.

* * * * *